United States Patent
Müller et al.

(10) Patent No.: US 10,277,089 B2
(45) Date of Patent: Apr. 30, 2019

(54) ELECTRIC MACHINE, METHOD FOR OPERATING SUCH AN ELECTRIC MACHINE, AND PRODUCTION METHOD

(71) Applicant: SIEMENS AKTIENGESELLSCHAFT, München (DE)

(72) Inventors: Jörg Müller, Nüdlingen (DE); Stefanie Reubelt, Rödelmaier (DE); Benjamin Volkmuth, Sulzthal (DE); Andreas Wehner, Bad Kissingen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/756,883

(22) PCT Filed: Aug. 9, 2016

(86) PCT No.: PCT/EP2016/068957
§ 371 (c)(1),
(2) Date: Mar. 1, 2018

(87) PCT Pub. No.: WO2017/036745
PCT Pub. Date: Mar. 9, 2017

(65) Prior Publication Data
US 2018/0316237 A1 Nov. 1, 2018

(30) Foreign Application Priority Data
Sep. 2, 2015 (EP) .................. 15183466

(51) Int. Cl.
*H02K 1/14* (2006.01)
*H02K 9/22* (2006.01)
*H02K 15/12* (2006.01)
*H02K 3/52* (2006.01)
*H02K 3/02* (2006.01)

(52) U.S. Cl.
CPC ............ *H02K 3/522* (2013.01); *H02K 1/146* (2013.01); *H02K 3/02* (2013.01); *H02K 9/22* (2013.01); *H02K 15/12* (2013.01)

(58) Field of Classification Search
CPC ............ H02K 1/00; H02K 1/14; H02K 1/146; H02K 3/00; H02K 3/02; H02K 3/52;
(Continued)

(56) References Cited

U.S. PATENT DOCUMENTS

| 6,858,965 B2 | 2/2005 | Müller et al. |
| 7,737,584 B2 | 6/2010 | Müller et al. |

(Continued)

FOREIGN PATENT DOCUMENTS

| CN | 101164218 A | 4/2008 |
| CN | 103825388 A | 5/2014 |

(Continued)

OTHER PUBLICATIONS

International Search Report issued by the European Patent Office in International Application PCT/EP2016/068957.

*Primary Examiner* — Tran N Nguyen
(74) *Attorney, Agent, or Firm* — Henry M. Feiereisen LLC

(57) ABSTRACT

An electric machine includes a rotor and a stator having a horizontal peripheral direction. The rotor and the stator interact electromagnetically. The stator has a number of offset, radially oriented teeth for a winding, with the teeth being arranged in the horizontal peripheral direction. The teeth are each connected to a tooth cap and to a tooth pole. At least one tooth is formed by two webs, which are spaced part in the horizontal peripheral direction and are oriented radially in the zenith direction, for accommodating a solidifiable, in particular curable, medium between the webs.

12 Claims, 4 Drawing Sheets

(58) Field of Classification Search
CPC ............ H02K 3/522; H02K 9/00; H02K 9/22; H02K 15/00; H02K 15/12
See application file for complete search history.

(56) References Cited

U.S. PATENT DOCUMENTS

| | | |
|---|---|---|
| 9,631,709 B2 | 4/2017 | Scholle et al. |
| 9,673,672 B2 | 6/2017 | Pannier et al. |
| 9,837,881 B2 | 12/2017 | Volkmuth et al. |
| 2003/0062780 A1* | 4/2003 | Kaneko .................. H02K 1/20 310/58 |
| 2006/0038450 A1* | 2/2006 | Matin ..................... H02K 9/20 310/58 |
| 2008/0315710 A1 | 12/2008 | Morioka et al. |
| 2013/0300229 A1 | 11/2013 | Müller et al. |
| 2015/0288230 A1* | 10/2015 | Foulsham ................ H02K 1/08 310/43 |
| 2016/0065011 A1 | 3/2016 | Schneider et al. |
| 2016/0211717 A1* | 7/2016 | Honda .................... H02K 5/08 310/43 |
| 2016/0294229 A1 | 10/2016 | Vollmer et al. |
| 2016/0294244 A1 | 10/2016 | Baehr et al. |

FOREIGN PATENT DOCUMENTS

| | | |
|---|---|---|
| DE | 10 2009 029 220 | 3/2011 |
| DE | 11 2012 006 771 | 7/2015 |
| EP | 2 677 633 | 12/2013 |
| WO | WO 2011/101986 | 8/2011 |
| WO | WO2014/115775 | 7/2014 |

* cited by examiner

ELECTRIC MACHINE, METHOD FOR OPERATING SUCH AN ELECTRIC MACHINE, AND PRODUCTION METHOD

CROSS-REFERENCES TO RELATED APPLICATIONS

This application is the U.S. National Stage of International Application No. PCT/EP2016/068957, filed Aug. 9, 2016, which designated the United States and has been published as International Publication No. WO 2017/036745 and which claims the priority of European Patent Application, Serial No. 15183466.0, filed Sep. 2, 2015, pursuant to 35 U.S.C. 119(a)-(d).

BACKGROUND OF THE INVENTION

The invention relates to an electric machine comprising a rotor and a stator having a horizontal peripheral direction, wherein the rotor and stator interact electromagnetically, wherein the stator has a number of offset, radially oriented teeth for a winding, wherein the teeth are arranged in the horizontal peripheral direction, wherein the teeth are each connected to a tooth cap and to a tooth pole. Furthermore, the invention further relates to a method for operating such an electric machine and to a production method for such an electric machine.

Armatures of electric machines are frequently equipped with windings on teeth, which are interconnected in a tooth on the end face of a laminated core. The higher the load on the electric machine, the more the tooth, as well as the winding around a tooth itself, heats up. This also applies in particular for electric motors with high rotational speeds. At high rotational speeds, armature tooth caps are frequently required, particularly for radially bracing the teeth that are subject to centrifugal force. Said tooth caps generally consist of high-strength steel and are implemented as closed structures. The tooth cap is shrunk onto a bolt of a shaft on the one axial side. The bolt frequently possesses radially aligned ventilation holes, if the electric motor is designed for higher outputs. The tooth cap, conversely, is embodied in a closed manner for stability reasons. Especially in the cap region on the winding, this leads to an insufficient dissipation of the waste heat arising there. Zones arise with very high winding temperatures (so-called "hotspots").

For this reason, the teeth are cast or impregnated in order to improve the heat dissipation from the tooth, inter alia. By casting and impregnating the teeth, a fixing of the windings may also be effected. Thus, in addition to the mechanical fixing and compacting of the laminated core, an electrical insulation of the windings from one another is achieved. The casting compound or the impregnating resin cannot, however, flow around the tooth completely. This means that the optimal heat dissipation and thus the optimal performance of the motor cannot be achieved.

After the winding has been impregnated into the grooves and the tooth, the tooth forms a solid, resin-filled unit, through which no cooling air can pass. In teeth of this kind, regular heat sources therefore emerge which restrict the thermal utilization of the dynamoelectric machine.

A high winding temperature therefore diminishes the service life of the winding insulation by a considerable amount. As a countermeasure, the output of the machine is therefore usually restricted or the machine is designed to be thermally overdimensioned.

SUMMARY OF THE INVENTION

It is therefore a first object of the invention to specify an electric machine comprising a stator with a winding which attains an improved performance. A second and a third object lie in the specification of a method for operating an electric machine and in a production method to this end.

The object related to the apparatus is achieved by an electric machine comprising a rotor and a stator having a horizontal peripheral direction, wherein the rotor and stator interact electromagnetically, wherein the stator has a number of offset, radially oriented teeth for a winding, wherein the teeth are arranged in the horizontal peripheral direction and wherein the teeth are each connected to a tooth cap and to a tooth pole, wherein at least one tooth is formed by two webs, which are spaced apart in the horizontal peripheral direction and are oriented radially in the zenith direction, for accommodating a solidifiable, in particular curable, medium between the webs, wherein the tooth cap has a recess, wherein the webs have a web end and the web ends are spaced apart in the horizontal peripheral direction by an end spacing and have an end depth extending transversely to the horizontal peripheral direction and the recess has at least the end spacing and/or the end depth, wherein the tooth cap has an upper side facing away from the web side and the upper side has a depression, in particular a depression for accommodating the medium, and wherein the depression is connected to the recess.

By means of the apparatus according to the invention, a simple introduction of the medium between the webs ensues. The heat transport, especially into the tooth cap, is augmented further still.

The object related to the method is achieved by specifying a method for operating an electric machine comprising a rotor and a stator having a horizontal peripheral direction, wherein the rotor and stator interact electromagnetically, wherein the stator has a number of offset, radially oriented teeth, wherein the teeth are arranged in the horizontal peripheral direction and wherein the teeth are connected in each case to a tooth cap and to a tooth pole and wherein the teeth are wound by at least one electrical conductor, in order to form a coil, wherein at least one tooth is formed by two webs, which are spaced apart in the horizontal peripheral direction and are oriented radially in the zenith direction, and the tooth pole has a cutout and the tooth cap has a recess, wherein a continuous connection is formed by the webs, the cutout and the recess for accommodating a medium at least between the webs, so that during operation the accommodated medium brings about a thermal evacuation of the heat at least from an inner side of the conductor and also from the tooth cap.

The object directed at the production method is achieved by specifying a production method for an electric machine comprising a rotor and a stator having a horizontal peripheral direction, wherein the rotor and stator interact electromagnetically and wherein the stator has a number of offset, radially oriented teeth, wherein the teeth are arranged in the horizontal peripheral direction and wherein the teeth are connected in each case to a tooth cap and to a tooth pole and wherein the teeth are wound by at least one electrical conductor, in order to form a coil, wherein at least one tooth is formed by two webs, which are spaced apart in the horizontal peripheral direction and are oriented radially in the zenith direction, and the tooth pole has a cutout and the tooth cap has a recess, wherein a continuous connection is formed by the webs, the cutout and the recess, and wherein by way of said connection at least between the webs, a medium, in particular a fluid medium is accommodated, which subsequently solidifies, in particular cures, so that during operation the accommodated medium brings about a thermal evacuation of the heat at least from an inner side of the conductor and also from the tooth cap.

The teeth, around which the wires are wound in the machine or in the motor, are implemented in an almost "hollow" manner, in order to enable the medium to flow on or into the rear region of the wires. This means that the wire is optimally connected to the medium and can be cooled more effectively than the teeth and the tooth cap could be alone. The performance of the motor rises as a result and thus the output which said motor can deliver over the entire rotational speed range, including at the nominal working point. This means that the winding can be cooled more efficiently, which in turn is conducive to an increase in the output of the electric machine. Since the heat can be dissipated more effectively in and from the tooth cap, an increase in the motor performance is possible over the entire speed range, including at the nominal working point. This can be implemented more shortly with the same output requirements for the motor.

The casting compound has additional contact with the end face of the webs. This likewise increases the cooling of the motor.

In the subclaims, further advantageous measures are listed which can be combined arbitrarily with one another in order to achieve further advantages.

The medium preferably has a thermal connection at least with the tooth cap and at least with the tooth pole to evacuate the heat.

In a further exemplary embodiment, there is a continuous connection between the webs and the recess to accommodate the medium.

In a further preferred embodiment, the webs are wound by an electrical conductor to form a coil, wherein by means of the continuous connection between the webs and the recess the medium can be introduced at least partially, but in particular completely, into the recess and also between the webs and so during operation by way of the accommodated medium at least a thermal evacuation of the heat from an inner side of the conductor and also from the tooth cap is brought about. This results in an increased volume of medium introduced; this means that more heat can be dissipated via the increased volume of medium.

In a preferred embodiment, the tooth pole has a cutout, so that a continuous connection arises between the webs and the cutout to accommodate the medium. Here too, the webs may have a web start, wherein the web starts are spaced apart in the horizontal peripheral direction by a start spacing and have a start depth extending transversely to the horizontal peripheral direction and wherein the cutout has at least the start spacing and/or the start depth. This results in a simple introduction of the medium between the webs.

In a further preferred example, the webs are wound by an electrical conductor to form a coil. Between the webs and the recess is a continuous connection, so that the medium can be introduced at least partially, but in particular completely, into the recess and also between the webs and so during operation by way of the accommodated medium at least a thermal evacuation of the heat from an inner side of the conductor and also from the tooth pole is brought about. This results in an increased volume of medium introduced; this means more heat can be dissipated via the increased volume of medium.

The medium is preferably a solidifiable, in particular curable fluid. The medium may also be a solidifiable, in particular curable plastic. This brings a cost benefit for larger quantities in particular. In a further embodiment, the webs oriented radially in the zenith direction are of equal length.

In a preferred embodiment, the webs oriented radially in the zenith direction have parallel edges or are trapezoidal. This may vary from winding to winding.

Preferably, the electric machine is embodied as a permanent magnet-excited synchronous motor.

BRIEF DESCRIPTION OF THE DRAWING

Further features, properties and advantages of the present invention are disclosed in the following description, making reference to the accompanying drawings, in which, shown schematically.

DETAILED DESCRIPTION OF PREFERRED EMBODIMENTS

Although the invention has been illustrated and described in more detail based on the preferred exemplary embodiment, the invention is not restricted by the examples given. Variations thereof can be derived therefrom by a person skilled in the art without departing from the protective scope of the invention as defined by the following claims.

Figure 1:
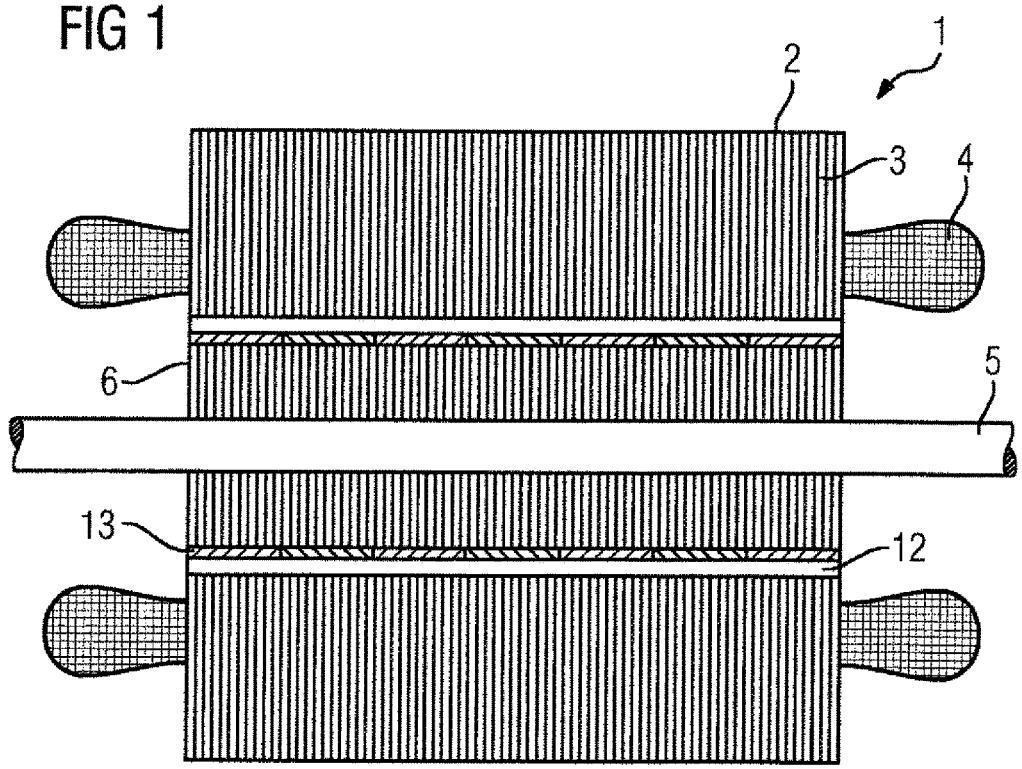
FIG. 1 shows a longitudinal section of the basic active parts of a dynamo-electric machine in accordance with the prior art.

FIG. 1 shows an electric, in this case dynamo-electric rotary machine 1, which has a stator 2, which is axially layered with stator sheets 3. The winding system of the stator 2 interacts with a rotor 6 via an air gap 12 and thus leads to the rotation of this machine.

In the present case, in which case a permanent magnet-excited synchronous machine is involved, the rotor 6 has surface magnets 13. The idea according to the invention can, of course, also be implemented with rotors 6 with embedded magnets.

A dynamo-electric rotary machine 1 of this kind can likewise be used as a generator.

Likewise, the inventive idea can also be applied for external rotor machines.

Figure 2:
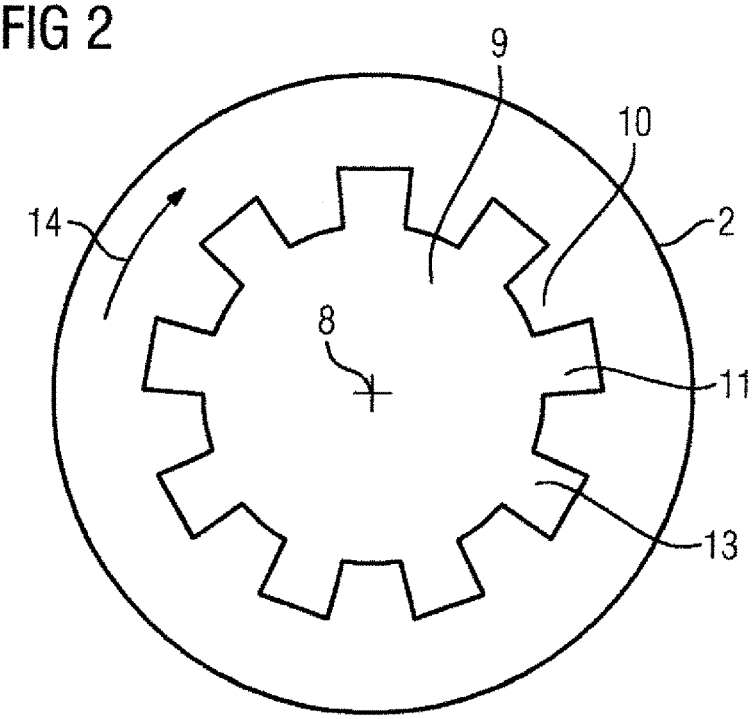
FIG. 2 shows a cross-section of a laminated core of a stator without winding system in accordance with the prior art.

FIG. 2 shows a cross-section of a stator laminated core 3 (FIG. 1) with an axis 8 in the stator hole 9, about which finally a shaft 5 (FIG. 1) rotates, which is connected to a rotor 6 (FIG. 1) in a torsion-proof manner. According to the prior art, teeth 10 in the horizontal peripheral direction 14 which are radially oriented in the zenith direction point towards the stator hole 9 and are spaced apart from one another by grooves 11. The teeth restrict the utilization of the dynamo-electric machine 1, since in the resin-impregnated winding system, in particular in the teeth, local regions with excessive temperature—so-called hotspots—emerge, which restrict the thermal utilization of the machine upwards during operation of the electric machine 1.

In order to protect the insulation of the winding system of a dynamo-electric machine, dynamo-electric machines are cooled. By way of this cooling, the waste heat arising in the electric machine is dissipated. The more effectively the heat dissipation from the electric machine is designed, the smaller the electric machine can be constructed with the same power output. Motors are cast or impregnated in order to improve the heat dissipation from the winding head, inter alia. The casting compound or the impregnating resin, or the plastic referred to in the further medium, cannot however flow around the tooth cap 20 completely. This means that the optical heat dissipation and thus the optimal performance of the motor cannot be achieved.

Figure 3:
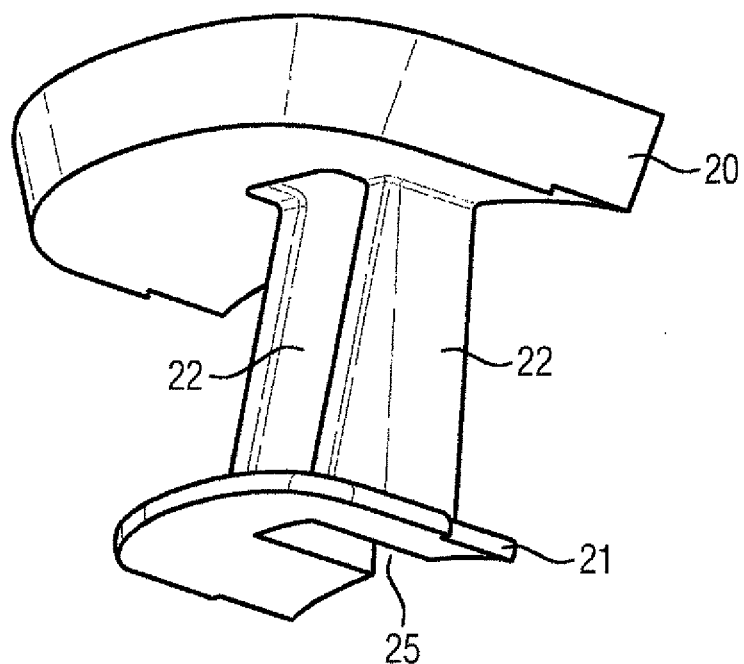
FIG. 3 shows a side view of an example of the webs according to the invention.

According to the invention—as shown in FIG. 3—at least one tooth is formed by two webs 22, which are spaced apart in the horizontal peripheral direction 14 (FIG. 2) by the spacing 23 (FIG. 4) and are oriented radially in the zenith direction, for accommodating a solidifiable, in particular curable, medium between the webs 22. This means that the tooth consists of two webs 22, which produce the necessary clearance. Each tooth is connected to a tooth cap 20 and to a tooth pole 21.

Figure 4:
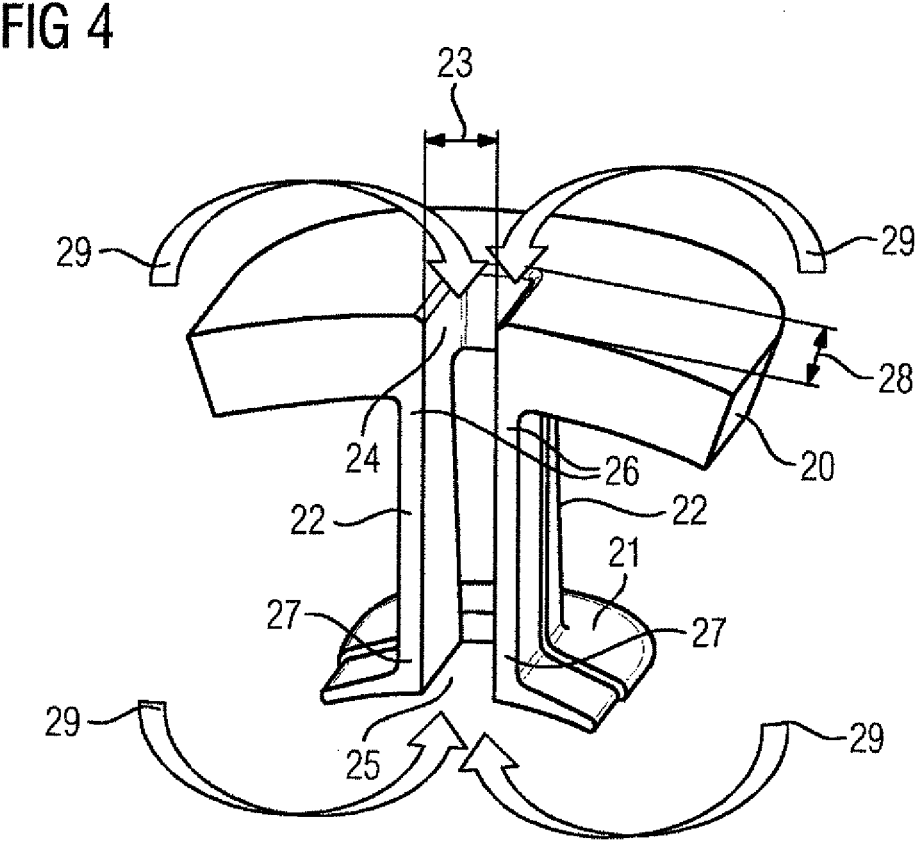
FIG. 4 shows the webs according to the invention with the flow direction of the medium.

FIG. 4 shows the tooth cap 20 from the rear. The remainder is implemented in a hollow manner. Likewise, the tooth cap 20 has a recess 24 and the tooth pole 21 has a cutout 25. The webs 22 also have a web end 26 and a web start 27, wherein the web ends 26 and also the web starts 27 here are likewise spaced apart by the spacing 23. Web ends 26 and web starts 27 also have a depth 28. The recess 24, the intermediate space between the webs 22 and the cutout 25 are now a continuous, equal-sized connection, which accommodates the medium with the flow direction 29 of the medium, i.e. the casting compound or the impregnating resin or the plastic. This can be introduced through the recess 24 or also the cutout 25 from two directions into the intermediate space between the webs 22. By way of the introduced medium, the heat evacuation from the conductor, the tooth cap 20 and the tooth pole 21 is improved.

The teeth, around which the wires are wound in the motor, are implemented in a "hollow" manner, in order to enable the medium to flow on the rear region of the wires. This means that the wire is optimally connected to the medium and can be cooled more effectively than the tooth cap 20/teeth (FIG. 2) could be alone. This means that the heat dissipation from the hotspots of the tooth cap 20 is substantially improved. This results in an increase in the motor performance over the entire rotational speed range, including at the nominal working point, since the heat in the tooth cap 20/conductor can be dissipated more effectively. This can be implemented more shortly with the same output requirements for the motor.

The casting compound or the impregnating resin or the plastic has additional contact with the end face of the stator laminated core 3 (FIG. 1). This likewise increases the cooling of the motor. The performance of the motor rises as a result and thus the output which said motor can deliver over the entire speed range, including at the nominal working point. The invention enables a homogeneous and complete filling of the stator winding.

By way of the invention, it is thus made possible to cast or impregnate a stator 2 (FIG. 1) completely, without a subsequent hole having to be made. Additionally, the advantage results that the casting compound or the impregnating resin or the plastic fills the stator winding and cavities reliably and forms a smooth surface facing the rotor. This has the advantage that there are no jumps in geometry, at which the mechanical stresses may become too high under some circumstances at high rotational speeds.

Figure 5:
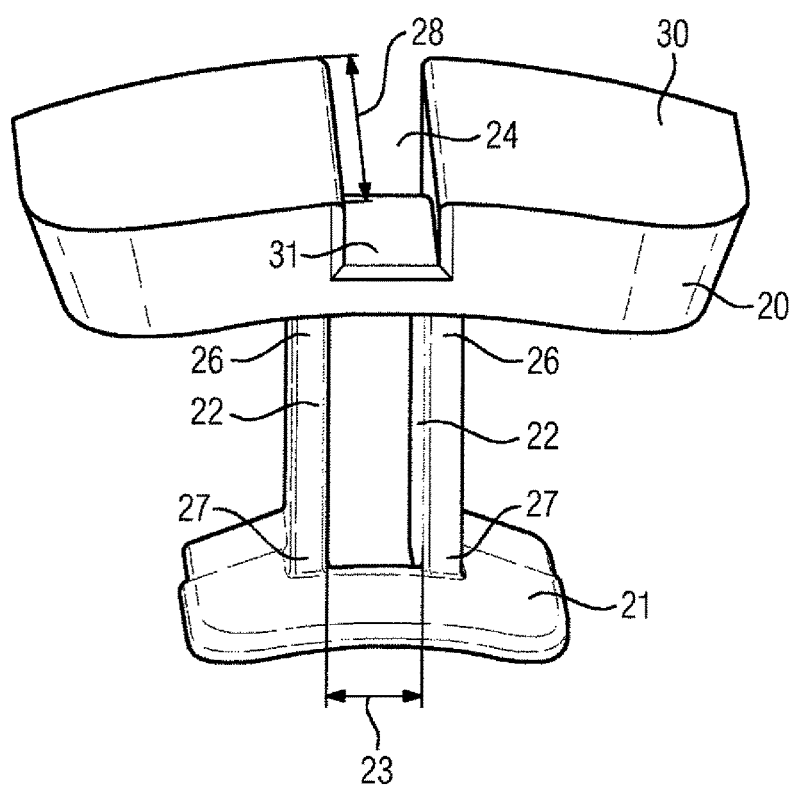
FIG. 5 shows a further exemplary embodiment of the invention.

FIG. 5 shows a further exemplary embodiment of the invention. The upper side 30 has a depression 31, in particular a depression for accommodating the medium. The tooth cap 20 effectively has an additional flow duct for the medium on the upper side 30 of the tooth cap 20. Here too, the medium can now be introduced and provide for increased heat evacuation at the hotspots.

Figure 6:
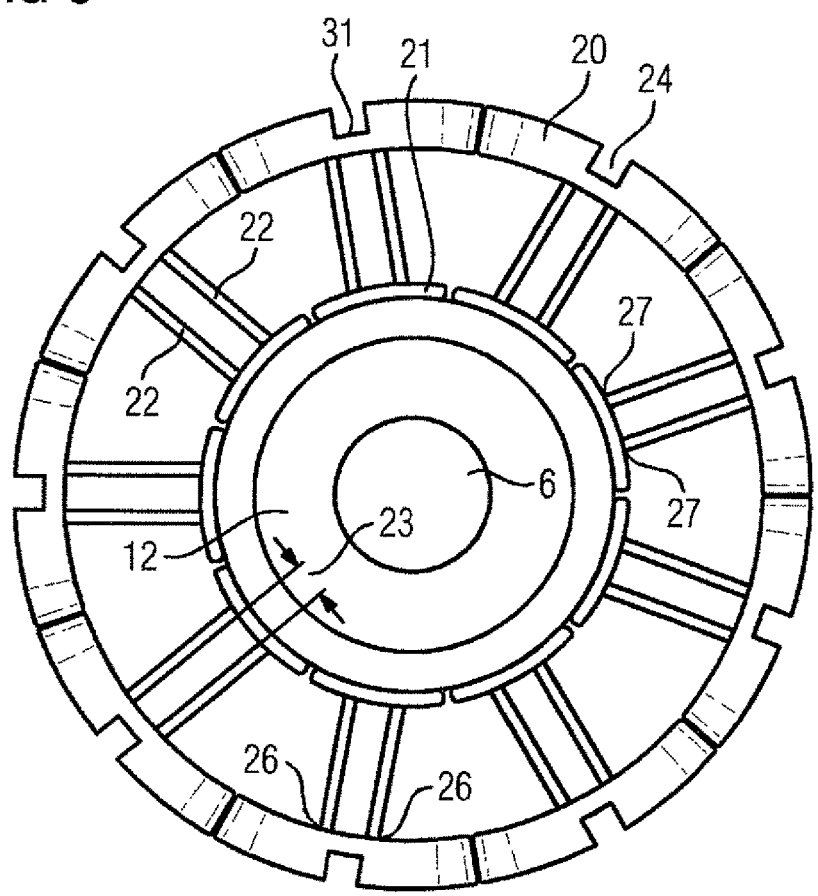
FIG. 6 shows the invention in the built-in, non-wound state.

FIG. 6 shows the invention in the built-in, non-wound state. As can be seen, the webs 22 are visible on the end face and therefore accessible for the medium in this region. The casting compound therefore has additional contact with the end face of the "laminated core", here the webs 22. This likewise increases the cooling of the motor.

What is claimed is:

1. An electric machine, comprising:
   a rotor; and
   a stator having a horizontal peripheral direction and interacting electromagnetically with the rotor, said stator having a number of offset, radially oriented teeth for a winding, said teeth being arranged in the horizontal peripheral direction, with each of the teeth being connected to a tooth cap having a recess and to a tooth pole, at least one tooth being formed by two webs, which are spaced apart in the horizontal peripheral direction and are oriented radially in a zenith direction, for accommodating a solidifiably curable, medium between the webs, said webs having each a web end, with the web end of one of the webs and the web end of the other one of the webs being spaced apart in the horizontal peripheral direction by an end spacing and having an end depth extending transversely to the horizontal peripheral direction, said recess being configured to have at least the end spacing and/or the end depth,
   wherein the tooth cap has a web-side distal upper side formed with a depression, in particular a depression for accommodating the medium, which is connected to the recess, thereby establishing a continuous connection between the webs, the recess and the depression to accommodate the medium.

2. The electric machine of claim 1, wherein the medium is thermally connected at least with the tooth cap and at least with the tooth pole.

3. The electric machine of claim 1, wherein the webs are wound by an electrical conductor to form a coil, said continuous connection between the webs and the recess enabling introduction of the medium at least partially or completely into the recess and between the webs so that the medium effects during operation a thermal evacuation of heat from an inner side of the conductor and from the tooth cap.

4. The electric machine of claim 1, wherein the tooth pole has a cutout to establish a continuous connection between the webs and the cutout to accommodate the medium.

5. The electric machine of claim 4, wherein the webs define each a web start, with the web start of one of the webs and the web start of the other one of the webs being spaced apart in the horizontal peripheral direction by a start spacing and having a start depth which extends transversely to the horizontal peripheral direction, said cutout being configured to have at least the start spacing and/or the start depth.

6. The electric machine of claim 4, wherein the webs are wound by an electrical conductor to form a coil, with a continuous connection being established between the webs and the cutout to enable introduction of the medium from at least partially to substantially completely into the cutout and between the webs, so that the medium effects during operation a thermal evacuation of heat from an inner side of the conductor and from the tooth pole.

7. The electric machine of claim 1, wherein the medium is a solidifiably curable fluid.

8. The electric machine of claim 1, wherein the medium is a solidifiably curable plastic.

9. The electric machine of claim 1, wherein the webs oriented radially in the zenith direction are of equal length.

10. The electric machine of claim 1, wherein the webs oriented radially in the zenith direction have parallel edges or are trapezoidal.

11. The electric machine of claim 1, constructed as a permanent magnet-excited synchronous motor.

12. A production method for an electric machine, said method comprising:
- forming a tooth by two webs, which are spaced apart in a horizontal peripheral direction and oriented radially in a zenith direction;
- winding an electrical conductor about the tooth to form a coil;
- connecting the tooth with a tooth cap and a tooth pole;
- forming the tooth pole with a cutout and the tooth cap with a recess to thereby establish a continuous connection by the webs, the cutout and the recess;
- introducing a medium, wherein said medium is a fluid medium, into the continuous connection at least between the webs; and
- allowing the medium to solidifiably cure thereby enabling the medium to effect during operation a thermal evacuation of heat at least from an inner side of the conductor and from the tooth cap.

* * * * *